United States Patent [19]
Allenspach

[11] 3,786,884
[45] Jan. 22, 1974

[54] FORCE-MEASURING APPARATUS INCLUDING TOTALIZER MEANS

[75] Inventor: Heinz Allenspach, Faellenden, Switzerland

[73] Assignee: Mettler Instrumente AG, Zurich, Switzerland

[22] Filed: Apr. 14, 1972

[21] Appl. No.: 244,054

[30] Foreign Application Priority Data
Apr. 16, 1971 Switzerland.................. 5947/71
Aug. 30, 1971 Switzerland................ 12683/71

[52] U.S. Cl. ........................ 177/210, 235/151.33
[51] Int. Cl. ...................... G01g 3/15, G01g 23/42
[58] Field of Search ........ 177/210, 2, 3, 25, DIG. 1, 177/DIG. 3; 235/151.33

[56] References Cited
UNITED STATES PATENTS

| | | | |
|---|---|---|---|
| 3,035,648 | 5/1962 | Williams | 177/210 X |
| 3,063,635 | 11/1962 | Gordon | 177/210 X |
| 3,366,191 | 1/1968 | Reid et al. | 177/210 |
| 3,488,589 | 1/1970 | Kintner | 177/210 X |
| 3,565,193 | 2/1971 | Wirth | 177/210 X |
| 3,565,194 | 2/1971 | Engle et al. | 177/210 X |
| 3,684,875 | 8/1972 | Smith et al. | 235/151.33 |

*Primary Examiner*—Richard B. Wilkinson
*Assistant Examiner*—Stanley J. Witkowski
*Attorney, Agent, or Firm*—Lawrence E. Laubscher

[57] ABSTRACT

Force-measuring apparatus of the type including electromagnetic compensation means having a movable member that is returned to a no-load position relative to a stationary member by the supply of compensating current pulses of constant amplitude and variable length to a compensation coil secured to said movable member, characterized by the provision of counter means for counting subtotal numbers of counting pulses during periods corresponding with the lengths of said compensating current pulses, respectively, and means including counter control means for periodically transferring to store means the total value of the successive subtotals in the counter means and for simultaneously resetting the counter means to zero. Coarse control means are provided for causing the totalized subtotal pulse count to correspond with a decimal multiple or fraction of a weight unit, and additional store means are provided for optionally indicating for each of a series of subtotal measuring operations the net arithmetic difference between the totalized value and a given pulse reference value (such as tare). According to an alternate embodiment, means including subtotal rate selection switch means are provided for establishing low and high frequency subtotal rates, respectively, and stage selection switch means are operable in conjunction with the operation of said rate switch selection switch means for supplying the counting pulses to corresponding low and high stages, respectively, of the counter.

9 Claims, 4 Drawing Figures

FORCE-MEASURING APPARATUS INCLUDING TOTALIZER MEANS

This invention relates generally to an improved force-measuring apparatus, such as a balance, having totalizer means for indicating the net sum of a plurality of periodic subtotal measuring operations.

It has been previously proposed—as evidenced, for example, by the prior U.S. application Ser. No. 222,960 filed Feb. 2, 1972 in the name of Peter Kunz—to provide a force-measuring apparatus of the type in which displacement of a movable member from an initial no-load position relative to a stationary member in accordance with the magnitude of an applied force controls by means of an electrical position sensing means a current which is supplied to an electromagnetic compensation means to counteract the movement. The current is supplied to the compensation means in the form of constant amplitude pulses the lengths of which vary in a given relationship with the particular magnitude of the force, the lengths of said compensation pulses being counted by means of high-frequency counting pulses which actuate a counter, thereby supplying a digital measuring result.

Generally the known measuring devices are so designed that in each case a single current pulse which compensates the force is counted by means of counting pulses of constant frequency, and the resulting sum is represented as the measuring result. It has been found that this arrangement suffers from a number of disadvantages.

Thus, for example, resolution is directly limited by the frequency of the counting pulse generator, for example an oscillator, and the duration of the measuring period. The frequency of the oscillator cannot be increased as desired however, if a considerable increase in cost is to be avoided, and because of the mechanical system, the measuring period cannot be selected of any desired duration, as otherwise there is the danger that with small forces and consequently short compensation current pulses, in relatively long measuring periods, after the termination of each compensation stage, the movable portion of the balance is displaced out of its position of equilibrium, thereby causing the system to become unstable.

It has also been found that random errors can falsify the measuring result, owing to short-duration interference vibrations. Such vibrations can seldom be completely eliminated. In the case of the above apparatus, such vibrations therefore have a particularly disadvantageous effect on the precision and reproducibility of the results, as the errors cannot be corrected out owing to the short measuring period. The present invention was developed to avoid the above and other drawbacks of the known force-measuring devices.

A primary object of the present invention is to provide an improved force-measuring apparatus including electromagntic compensation means of the type wherein the lengths of the compensation current pulses vary in accordance with the extent of displacement of a movable member from its initial no-load position by the application of force thereto, characterized in that subtotals of the counting pulses which correspond with the lengths of said compensating current pulses are periodically counted by counter means, which subtotals are totalized and transferred to store means.

Preferably the totalizing means comprise one or more frequency dividers connected with the output terminal of an oscillator for producing a signal of lower frequency then the oscillator, and a counter control which is supplied with control pulses both from the frequency divider means and the oscillator.

In accordance with a more specific object of the invention, means are also provided for adjusting the relationship between the weight value of an individual counting pulse and the number of totalized individual results, whereby the representation of the measuring result is in decimal multiples of weight units. In addition to at least one frequency divider, such adjusting means are preferably in the form of an adjustable constant current generator for supplying the compensation current pulses.

In accordance with a further object of the invention, indication and/or evaluation means are provided for representing the digital measuring result, which means are so designed as to afford an indication of all but the last decimal of the sum of the counting pulses. Consequently, a further weakness of previously proposed arrangements—namely instability of indication of the last place (in the case of decade transfer, the respective last places)—is substantially eliminated, since because of the large number of counting pulses per weight unit, the apparatus according to the invention nonetheless produces a resolution of the indication which is at least as great as in the previous arrangements.

Another disadvantage of previous arrangements is that they do not permit an initial loading (in the case of balances, the tare) to be taken into account electrically. Accordingly, use thereof on beam-less devices (such as for example pot balances, in which the dead weight of the system cannot be compensated by a counter weight as in the case of beam balances) was only possible when mechanical dead weight compensation, for example by means of springs, was provided. In accordance with another feature of the present invention, this last mentioned disadvantage is overcome in that means are also provided which, in consecutive measuring operations, selectively indicate the overall total or the difference of the part totals. These means preferably substantially comprise a forward-reverse logic means associated with the counter, zero detector means, and a further storage means, each of said means receiving their control orders from the counter control.

Other objects and advantages of the invention will become apparent from a study of the following specification when viewed in the light of the accompanying drawing in which.

Figure 1:
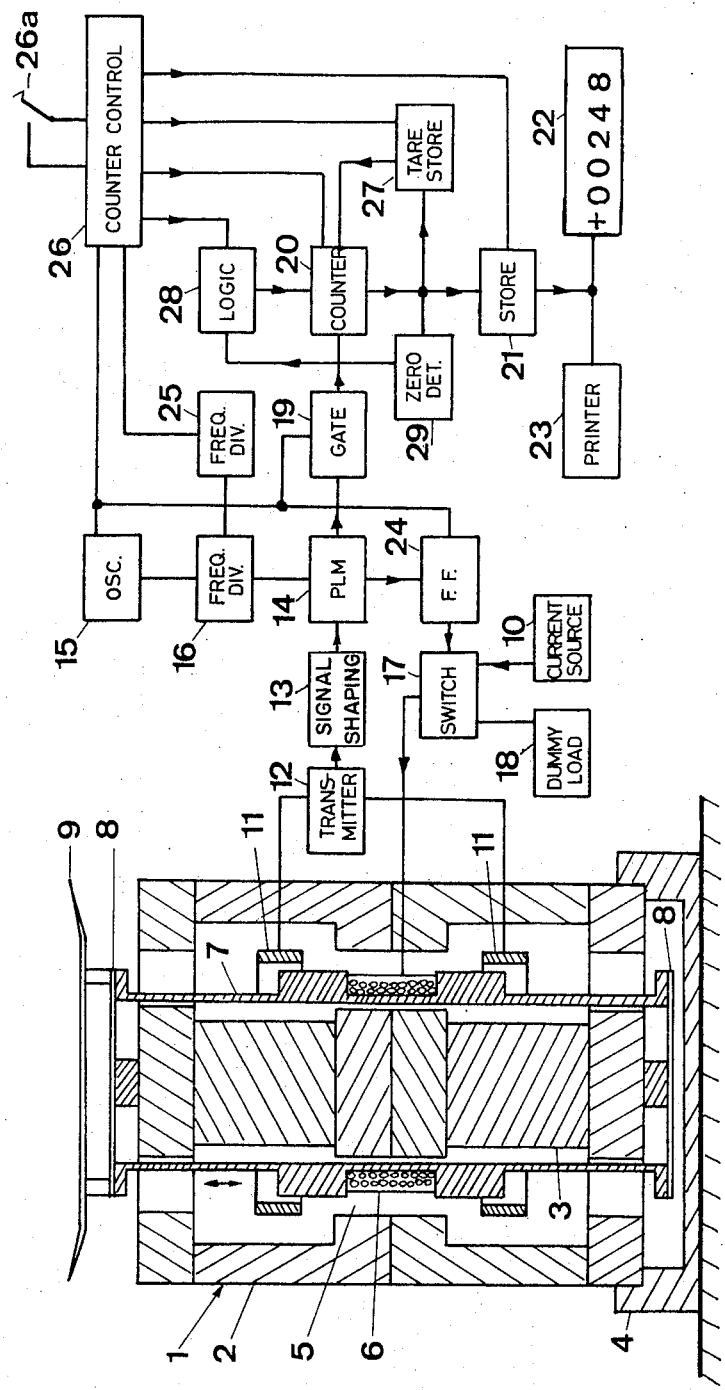
FIG. 1 illustrates schematically in block diagram form the electrical system of the present invention as used in connection with a pot type balance.

Referring first more particularly to FIG. 1, the force measuring apparatus 1 is of the conventional pot magnet type including a stationary housing 2 that is closed on all sides except for the necessary apertures for the movable balance member 7. The housing 2 is supported by way of a base 4 on a fixed support surface. Arranged with clearance in an annular air gap 5 between the housing 2 and the permanent magnet 3 is an annular coil 6 for producing the compensation force. The annular coil 6 is fixedly connected to the movable member 7, which in turn is resiliently connected with the housing 2 by two substantially round spring members 8. The upper end of the movable portion 7 comprises a weighing pan 9 for carrying material to be weighed. Two annular vertically spaced capacitors 11 which are fixedly connected to the housing 2 form in conjunction with the movable portion 7 the mechanical part of the position sensing means.

Figure 3:
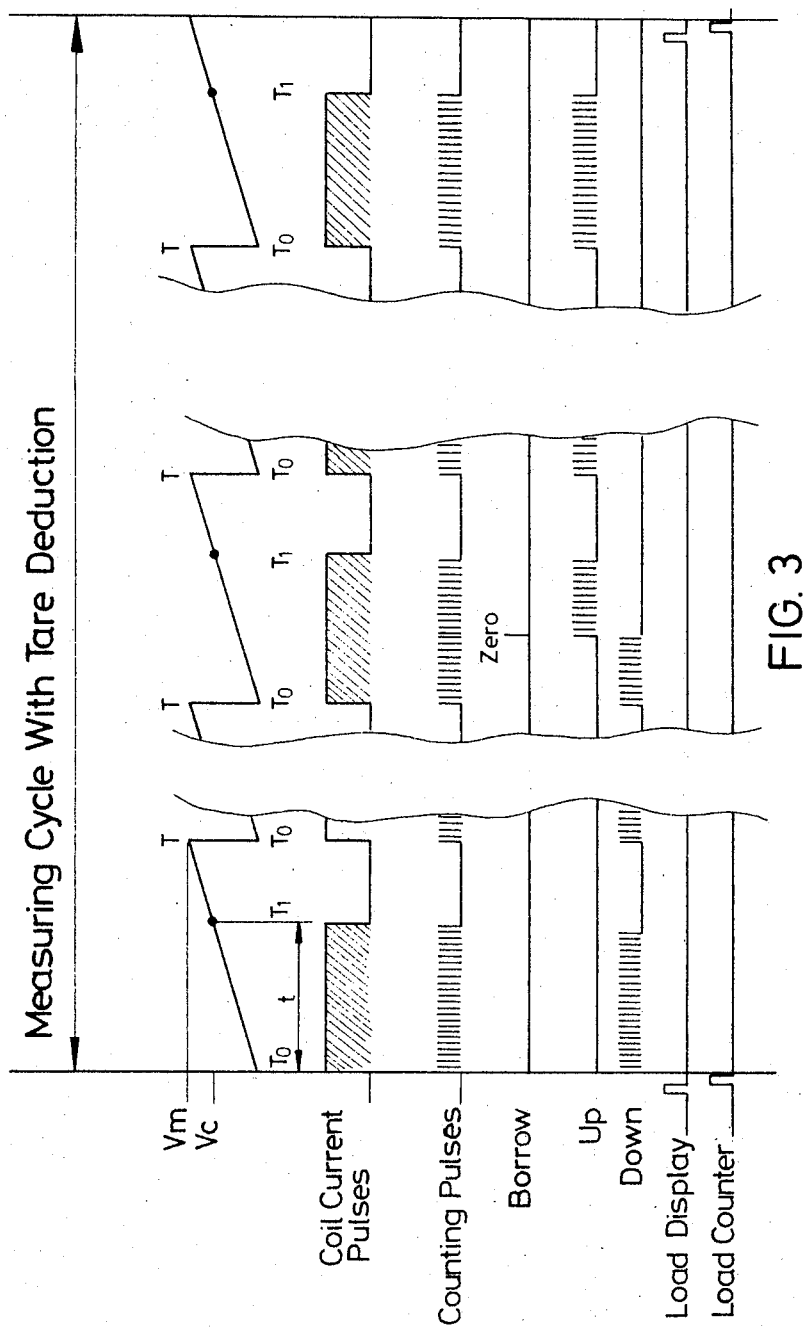
FIG. 3 is a voltage/time diagram illustrating the operation of the modulator means for varying the lengths of the constant amplitude compensating current pulses, together with the resultant coil current and counting current pulses.

In any weighing operation, the annular coil 6 is supplied with direct current by a constant current source 10 until the movable portion 7, which has been deflected out of the zero no-load position under the influence of the load of material to be weighed on the pan 9, has been returned to said no-load position. The output signals of the annular capacitors 11 are converted in a transmitter circuit 12 and passed into signal shaping means 13 to produce a control voltage Vc (FIG. 3) that is applied to a pulse length modulator 14, as illustrated in FIG. 3. The pulse length modulator is, per se, well known in the art, as taught, for example, by the Naydan et al. U.S. Pat. No. 3,028,550, among others. The control voltage Vc is compared with a sawtooth voltage produced by the sawtooth generator means 16 including a first frequency divider, which sawtooth voltage periodicaly rises from zero at the moment $T_0$ to a maximum value at the moment T, the maximum value corresponding at least to the weighing frame. During the initial period from $T_0$ to $T_1$ (i.e., the time period $t$ in FIG. 3) when the sawtooth voltage increases from zero to the control voltage $V_{C'}$, switch 17 is in a first position in which compensation current is passed from the constant current source 10 through the annular coil 6 by means of the pulse length modulator 14. After the sawtooth voltage in the pulse length modulator 14 has increased to the value of the load-dependent control voltage $V_{C'}$, switch 17 is actuated to connect current source 10 with dummy load 18, so that during the remaining time from $T_1$ to $T_{0'}$, all the current from source 10 is switched over to the dummy load 18. The oscillator 15 also supplies a reversible (i.e., "up-down") counter 20 with high-frequency counting pulses via a gate 19 that is controlled by the pulse length modulator 14 in such a way that it opens at the moment $T_0$ (when current begins to flow to the annular coil 6), and is closed again after the time $t$ (when current is passed to the dummy load 18). Thus, the counter 20 is supplied with counting pulses only during the duration of the compensation current pulses. Flip-flop means 24 arranged between the pulse length modulator 14 and the switch 17 carries out the synchronization function in such a way that when there is coincidence between the control voltage and the sawtooth voltage in the pulse length modulator 14, it receives a switch-over release signal, although switching over will only occur after termination of the input of the counting pulse just coming from the oscillator 15. Consequently, the switching operation, which is always synchronized to the same flank of the respective counting pulse, provides optimum coincidence between the length of the compensation current pulse and the number of corresponding counting pulses.

In the prior measuring systems, the measured result is transferred from the counter 20 at the given moment $T_1$ directly to indication storage means 21 and represented for digital reading by a visible indication device 22 (Nixie tubes), or by printed read-out afforded by printing means 23. In the present invention, on the other hand, means including a further frequency divider 25 and counter control means 26 are provided for effecting a plurality of individual subtotal weighing operations the total pulse sum of which is then transferred to store means 21, as will be explained in detail hereinafter in a numerical example.

The oscillator 15 supplies counting pulses at a frequency of 1 MHz, which are supplied at that frequency to the gate 19 and, while the gate 19 is open, to the counter 20. The first frequency divider of the sawtooth generator means 16 reduces the frequency in a ratio of 1:2,000, so that every 2 ms (interval between pulses) the pulse length modulator 14 receives a pulse which in each case (a) opens the gate to the counter 20, and (b) connects the current source 10 through the switch 17 to the annular coil 6 and (c) starts a new rise of the sawtooth voltage (moment $T_0$). Therefore each individual weighing operation lasts 2 ms, in each case current flowing and pulses being counted only for the portion of time $t$ (maximum 2 ms) which corresponds to the particular load to be weighed.

Connected with the output terminal of the first frequency divider of the sawtooth generator means 16 is a second frequency divider 25 which again reduces the frequency, this time in a ratio of 1:200. The counter control 26 therefore receives a pulse every 0.4 s, which causes the particular condition of the counter 20 at that moment to be transferred to the indication storage means 21 and also simultaneously causes the counter 20 to be set to zero, ready for the next counting operation. Therefore 200 individual subtotal results are totalized to indicate the weighing result. The number of counting pulses corresponding to this total is illustrated in the indication means 22, the last decimal place being omitted. This produces the advantageous result that the influence of interference vibrations are virtually eliminated by determining an average. Furthermore, there is also no longer any danger that erroneous measuring results caused by the settlement time of the balance (about 0.1 s) can appear in the indication. Finally, at least one further decimal place is obtained in the digital representation of the weight.

Another substantial advantage of the above described arrangement lies in the stability of indication. By using the total of counting pulses from 200 individual weighing operations, depending on the selected parameters, there are from $10^6$ to $10^7$ counting pulses available, so that if only the last (unstable) decimal place is to be excluded from the indication of the weight, there still remains a resolution of from $10^{-5}$ to $10^{-6}$.

The above mentioned parameters are: current strength of the constant current source 10, frequency of the oscillator 15, reduction ratios of the frequency dividers 16 and 25, and the weighing range represented by the maximum value (Vm) of the sawtooth voltage in the pulse length modulator 14. Added to this, further means may be included in the counter control 26 for suppressing given multiplies of pulses (for example, each third or each eighth counting pulse) so that the counter 20 counts a correspondingly reduced number of pulses. By adjusting these parameters, coarse calibration of the counting pulses can be effected in such a way that an indicated pulse approximately corresponds to a decimal multiple or fraction of a weight unit. In order to achieve precise coincidence (fine calibration), the constant current generator 10 is made adjustable such that the current strength (amplitude of the compensation current pulses) can be varied by a maximum of ±5 percent from the rated value. This adjustability offers the further advantage that the balance can be adapted by adjustment to local fluctuations in acceleration due to gravity.

In accordance with another important feature of the invention, means may be provided for weighing operations with tare and for taking into account the dead load of the system. Connected in parallel with the indication storage means 21 is a tare storage means 27, and also provided is a conventional bistable logic circuit 28 (for example, a flip-flop device as shown in the patents to Clement et al. No. 3,545,284 and Reid et al. No. 3,366,191), a tare switch 26a which can be actuated by hand and which is connected with the counter control 26, and a zero (i.e. "null") detector 29 (as indicated, for example by the Hobel et al. Pat. No. 3,372,579). For carrying out weighing operations with tare, after actuating the tare switch 26a the weight value ascertained from the taring operation is also introduced in the tare storage means 27. In subsequent weighing operations, the value of the tare storage means 27 is initially introduced into the counter 20, whereupon the forward-reverse logic circuit 28 causes the counter 20 to count backwards (that is to say, the counting pulses which enter it are subtracted from the tare value) until the zero detector 29 signals that zero has been reached. This signal passes to the forward-reverse logic circuit 28 which then causes the counter 20 to count in the forward direction again.

If no additional material to be weighed is laid on the weighing pan 9, as many pulses pass into the counter 20 as are stored in the tare storage means 27; at the end of a measuring cycle of 0.4 s, the counter 20 has therefore reached zero and this result is stored in the indication storage means 21 and passes into the indication means 22 and to the printing means 23.

If however further material is laid on the weighing pan 9 (or removed therefrom) more (or less, respectively) counting pulses pass into the counter 20 than are stored in the tare storage means 27. The excess (or the deficit, respectively) is passed into the indication storage means 21 at the end of the measuring cycle, and indicated for the duration of the next measuring cycle. It should be noted that the above described arrangement causes the particular result to appear in the indication means 22 with a right sign with its real value. For example a surplus of 315 g (being the weight of additional material on the pan 9) is indicated as "+0315", while a removal of weight is not indicated as a complement, as in the previously known arrangements, but, for example when 315 g is removed, as "−0315". The correct sign is also derived from the forward-reverse logic circuit 28.

it is quite obvious that by repeated actuation of the tare switch 26a, it is thus also possible to weigh a plurality fo components, with a respective indication of each net excess.

The dead load of the balance can also be taken into account in the above described manner. By actuating the tare switch 26a, for example at the beginning of a series of net weighing operations, the value of the weight of the dead load is eliminated from the weight indication. With this arrangement it is also possible to reset the zero point of the balance at any time if required, by redetermining the dead load simply by actuating the tare switch 26a.

The above described apparatus is suitable not only for individual and series measurements in rapid succession (weighing time of about 0.5 s), but also for determining weights which vary with time; in the latter case, automatically registering devices can be connected to the apparatus in known manner. Obviously the invention can be generally applied to other kinds of electromagnetically compensating balances, for example with balance beams, and also to corresponding force-measuring apparatuses.

Figure 4:
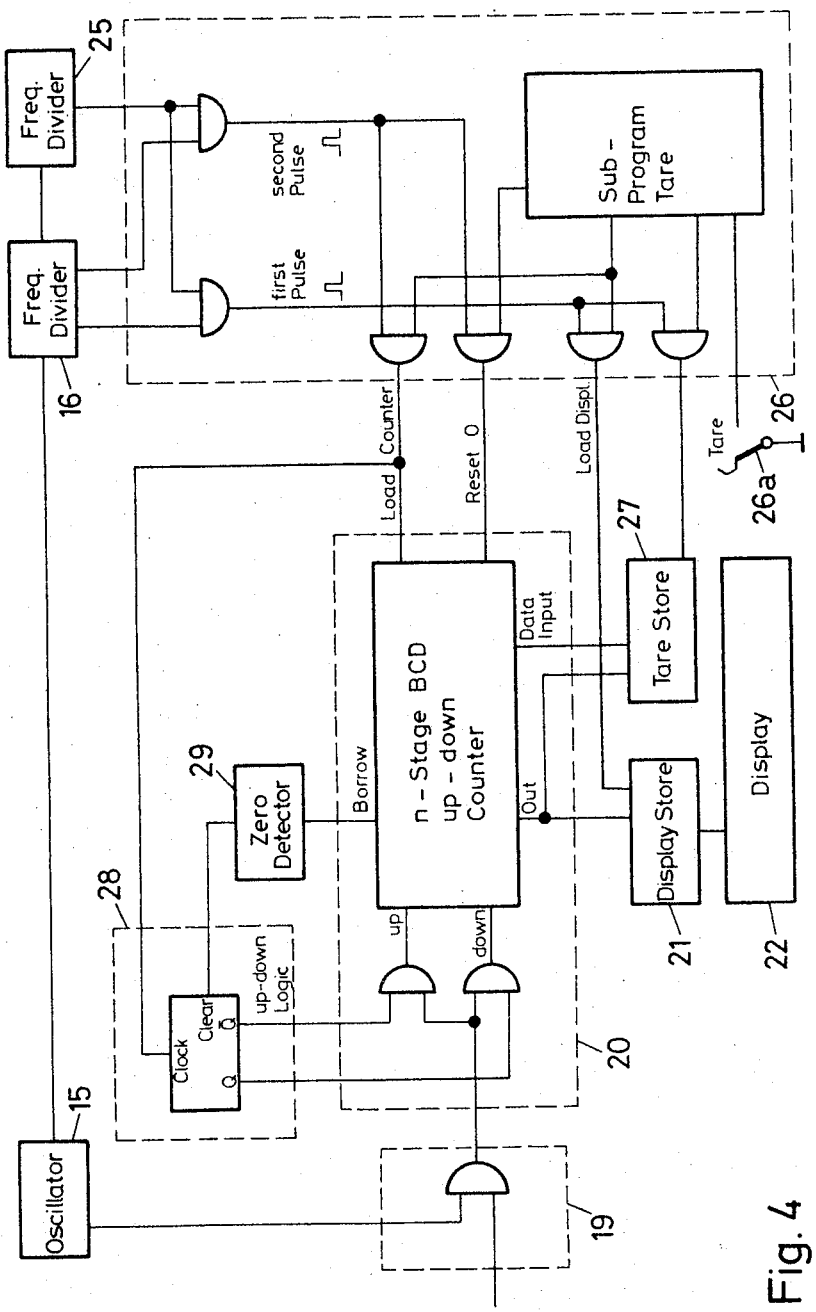
FIG. 4 is a detailed electrical block diagram of the counter control means of FIG. 2.

The internal logic circuitry of the counter 20 and the counter control means 26 is shown in FIG. 4. It will be seen that counter 20 is an n-stage counter having up and down input terminals connected with the gate 19 and the up-down logic means 28, a borrow output connected with the zero detector 29, a data input connected with the tare store means 27, reset and load counter inputs connected with the counter control means 26, and an output terminal connected with the store means 21 and the tare store 27. The borrow, counter up, counter down, load display and load counter operations relative to the sawtooth waveform input signal to the modulator 14 are illustrated in FIG. 3.

Figure 2:
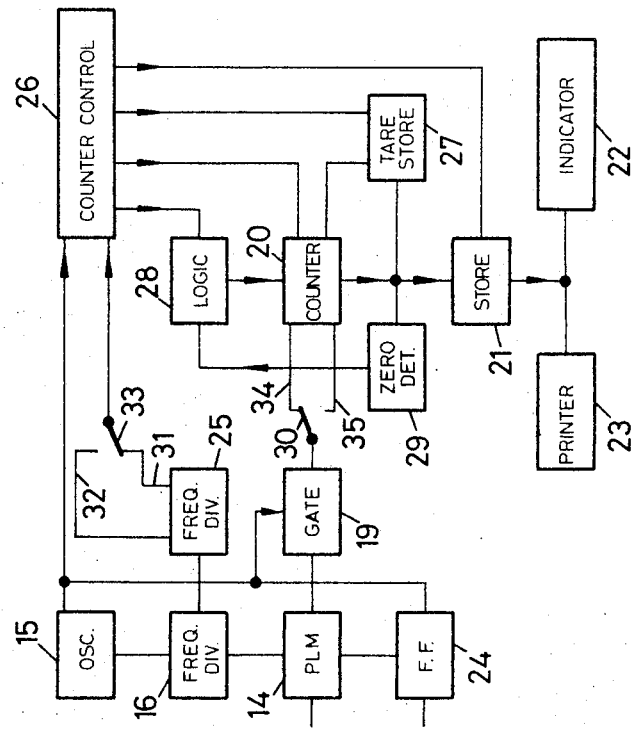
FIG. 2 is an alternate embodiment of the electrical system of FIG. 1.

FIG. 2 illustrates an advantageous alternative form of the electrical circuitry of the apparatus according to the invention. The arrangement differs from that shown in FIG. 1 in that the frequency divider 25 has two outputs 31 and 32 which are selectively connected by way of a frequency selection switch 33 to an input of the counter control 26. The two outputs 31 and 32 respectively correspond to a reduction of 1:200 or 1:20, respectively; that is to say, every 0.4 or every 0.04 sec., respectively, the counter control 20 will receive a control pulse (the frequency of the oscillator 15 is 1 MHz, the frequency divider 16 reduces that in the ratio 1:2,000, and therefore supplies a pulse to the frequency divider 25 every 2 ms). This control pulse causes the particular condition of the counter 20 at receipt of the pulse to be transferred to the indication storage means 21 (and, if desired, to the tare storage means 27) and to the indication means 22.

The output of the gate 19 can be selectively connected by way of a stage switch 30 to one of two inputs 34 or 35 of the counter 20. The input 34 passes the counting pulse to the last (lowest) counting stage, while the input 35 acts upon the next higher counting stage.

The two switches 30 and 33 can be switched by hand and are mechanically coupled (not shown) in such a way that when a divider output 31 or 32 is operative the respective counting stage 34 or 35 is actuated. Therefore in an extended measuring cycle, after 200 individual measuring operations a measuring result is obtained with a resolution which is higher by a decimal power than that obtained in a shorter measuring cycle after 20 individual measuring operations.

Instead of two selectable measuring cycles as described above it would also be possible, if required, to provide three such cycles, that is to say there would be three different outputs at the frequency divider 25, three inputs at the counter 20 and correspondingly three positions of the switches 30 and 33.

The above described alternative embodiment with selectable duration of the measuring cycles makes it possible, with the same apparatus to carry out both precise measurements with a high degree of resolution and also less precise measurements with a lower degree of resolution. The latter case occurs for example when material to be weighed is to be weighed-in or roughly weighed. With this alternative embodiment it is possible on the one hand to carry out substantially more measuring operations per unit of time, when the precision and resolution of the measuring result is not so very important, and on the other hand, by simply switching over the duration of the measuring cycle, the device can be set into a different operating condition in which, after a correspondingly longer measuring time, it supplies more accurate results whose resolution is higher for example by a tenth power.

The above described force measuring apparatus thus has a resolution which in comparison with the previously proposed apparatus is less dependent on the duration of the individual measuring periods and the frequency of the counting pulses, and which is also capable of substantially eliminating the influence of short-duration vibrations by averaging any errors resulting from the corresponding interference oscillations of the movable portion, resulting in a better degree of precision and reproducibility of the measuring results.

While in accordance with the provisions of the Patent Statutes the preferred forms and embodiments of the invention have been illustrated and described, it will be apparent that various changes and modifications may be made without deviating from the inventive concepts.

What is claimed is:

1. Weighing apparatus, comprising
    a. a stationary member including means defining a stationary magnetic field;
    b. a movable member normally having an initial no-load position relative to said stationary member;
    c. electromagnetic compensation means operable upon the application to said movable member of a weight to be measured for returning said movable member to said no-load position, said compensation means including
        1. compensation coil means mounted on said movable member, and
        2. means for supplying to said compensation coil direct-current pulses of constant height and of a length that corresponds with the instantaneous extent of displacement of said movable member from said no-load position, thereby to establish in said compensation coil means a restoring magnetic field relative to said stationary magnetic field, said pulse supplying means including
            a. position detecting means for generating a displacement signal the magnitude of which corresponds with the extent of displacement of the movable member from the no-load position;
            b. means including an oscillator and a first frequency divider for generating a sawtooth voltage of a relatively high frequency;
            c. means including normally-open switch means operable to connect a source of direct current with said compensation coil; and
            d. pulse length modulator means for periodically closing said switch means for periods of time that correspond with the magnitude of said displacement voltage relative to the instantaneous magnitude of said sawtooth voltage;
    d. pulse counter means;
    e. gate means operable by said pulse length modulator means for supplying counting pulses from said oscillator to said counter means during the periods of time said switch means is closed by said pulse length modulator, whereby said counter means continuously totalizes said pulses;
    f. counter pulse storage and display means; and
    g. means for periodically transferring to said storage and display means the instantaneous totalized value of the pulses in said counter means, said transfer means including
        1. second frequency divider means connected with said first frequency divider means for producing transfer pulses of a relatively low frequency, and
        2. counter control means operable by said low frequency transfer pulses for transferring the totalized condition of said counter means to said storage and display means and for resetting said counter to zero.

2. Apparatus as defined in claim 1, and further including coarse and fine calibration means for so adjusting the weight value of an individual counting pulse relative to the number of totalized individual results as to effect representation of the measured result as a decimal multiple of a weight unit.

3. Apparatus as defined in claim 2, wherein said fine calibration means comprises means for adjusting the amplitude of the compensating current pulses produced by said constant current source.

4. Apparatus as defined in claim 2, wherein said coarse calibration means includes means associated with said counter control means for suppressing each of a given multiple of said counting pulses.

5. Apparatus as defined in claim 1, and further including indicating means connected with said store means for providing a visible indication of all but the last decimal place of the total pulse count contained in said store means.

6. Apparatus as defined in claim 1, wherein said pulse counter is reversible; and further including
    h. tare storage means;
    i. tare switch means for initially storing in said tare storage means a number of pulses that corresponds with the tare weight;
    j. means operable upon initial activation of said counter means for transferring the tare pulses from said tare store means to said counter;
    k. forward-reverse logic means for causing said counter to initially operate in the reverse direction to subtract the weight pulses from the tare pulses; and
    l. zero detector means operable when the number of tare pulses in the counter has been reduced to zero for causing the forward-reverse logic means to reverse the counting direction of said counter, whereby said counter again counts in the forward direction.

7. Apparatus as defined in claim 1, wherein said totalizing means includes rate selection switch means for alternately selecting first and second rates at which the subtotal counting operations are performed.

8. Apparatus as defined in claim 7, wherein one of said rates of counting operations is a decimal multiple of the other.

9. Apparatus as defined in claim 8, wherein said counter means includes a plurality of decimal stages, and further including stage selection switch means for supplying said counting pulses to that stage of said counter means that corresponds with the rate of subtotal counting operations selected by said rate selection switch means, respectively.

* * * * *